(12) United States Patent
French et al.

(10) Patent No.: US 9,361,402 B2
(45) Date of Patent: Jun. 7, 2016

(54) TIERED INDEX MANAGEMENT

(71) Applicants: Blaine French, Concord, MA (US);
Shailesh Mungikar, Pune (IN); Nandan Marathe, Pune (IN); Anant Agarwal, New Delhi (IN)

(72) Inventors: Blaine French, Concord, MA (US);
Shailesh Mungikar, Pune (IN); Nandan Marathe, Pune (IN); Anant Agarwal, New Delhi (IN)

(73) Assignee: SYBASE, INC., Dublin, CA (US)

( * ) Notice: Subject to any disclaimer, the term of this patent is extended or adjusted under 35 U.S.C. 154(b) by 247 days.

(21) Appl. No.: 14/143,702

(22) Filed: Dec. 30, 2013

(65) Prior Publication Data

US 2015/0186549 A1    Jul. 2, 2015

(51) Int. Cl.
*G06F 17/30* (2006.01)

(52) U.S. Cl.
CPC .... *G06F 17/30946* (2013.01); *G06F 17/30961* (2013.01)

(58) Field of Classification Search
CPC ............... G06F 17/30321; G06F 17/30598; G06F 17/30631; G06F 17/30961
See application file for complete search history.

(56) References Cited

U.S. PATENT DOCUMENTS

| | | | |
|---|---|---|---|
| 8,700,583 B1 * | 4/2014 | Lesiewicz | G06F 17/30321 707/696 |
| 2010/0122252 A1 * | 5/2010 | Dasch | G06F 9/5083 718/100 |
| 2015/0058568 A1 * | 2/2015 | Fong | G06F 12/128 711/122 |
| 2015/0134678 A1 * | 5/2015 | Hu | G06F 17/30312 707/756 |

\* cited by examiner

*Primary Examiner* — Rehana Perveen
*Assistant Examiner* — Alexander Khong
(74) *Attorney, Agent, or Firm* — Sterne, Kessler, Goldstein & Fox P.L.L.C.

(57) ABSTRACT

Disclosed herein are system, method, and computer program product embodiments for storing data in a database using a tiered index architecture, An embodiment operates by creating a first tier and assigning a first threshold size to the first tier. When the first tier exceed the first threshold size, the system pushes data from the first tier into a second tier.

16 Claims, 8 Drawing Sheets

TIERED INDEX MANAGEMENT

BACKGROUND

Database systems typically maintain their data in a sorted index in order to efficiently find and retrieve information. When inserting new data into an existing database, the database places the new data in the appropriate location to maintain the sorted index. The insertion operation needs to read existing data to determine where to insert the new data. The time it takes to perform this sorted insert operation depends on the size of the index. As the index grows, the database must read and move more data in order to maintain the sorted index. As a result, an insert operation takes longer as the database grows larger.

Another challenge in maintaining large indices is balancing between densely packing index data and allowing empty spaces for faster incremental inserts. A denser storage requires more splitting during an incremental insert, while a sparser storage leads to more disk I/O reads during querying.

A segmented index approach that maintains separate indices over different data ranges can be used to overcome these challenges. However, this approach requires accurate data model forecasting, because if the data range partitioning is not accurate, segment size can differ substantially and individual segments may become a bottleneck.

BRIEF DESCRIPTION OF THE DRAWINGS

The accompanying drawings are incorporated herein and form a part of the specification.

FIG. 7 is an example computer system useful for implementing various embodiments, In the drawings, like reference numbers generally indicate identical or similar elements. Additionally, generally, the leftmost digit(s) of a reference number identifies the drawing in which the reference number first appears.

DETAILED DESCRIPTION

Provided herein are system, method and/or computer program product embodiments, and/or combinations and subcombinations thereof, for storing data in a database using a tiered index architecture.

Overview

Generally, inserting data into a sorted database index requires inspecting data in the index to determine where to insert the new data. As the database receives more data and the index grows, inspecting the index takes a proportionally longer time. In a worst ease scenario, an insert operation may require reading the entire index data. According to an embodiment, the tiered index architecture described herein divides an index into multiple tiers. Each tier is sorted, but data across tiers can remain unsorted. The system can then insert new data into one of the tiers. Because the individual tiers are smaller than the totality of the index, the architecture can reduce the time required to insert new data. In an embodiment, inserting data into fixed size tiers can also make the time required for an insert operation proportional to the size of the load, instead of the size of the database. The system can also keep data packing in the index as dense as possible in order to keep data I/O as low as possible.

Figure 1:
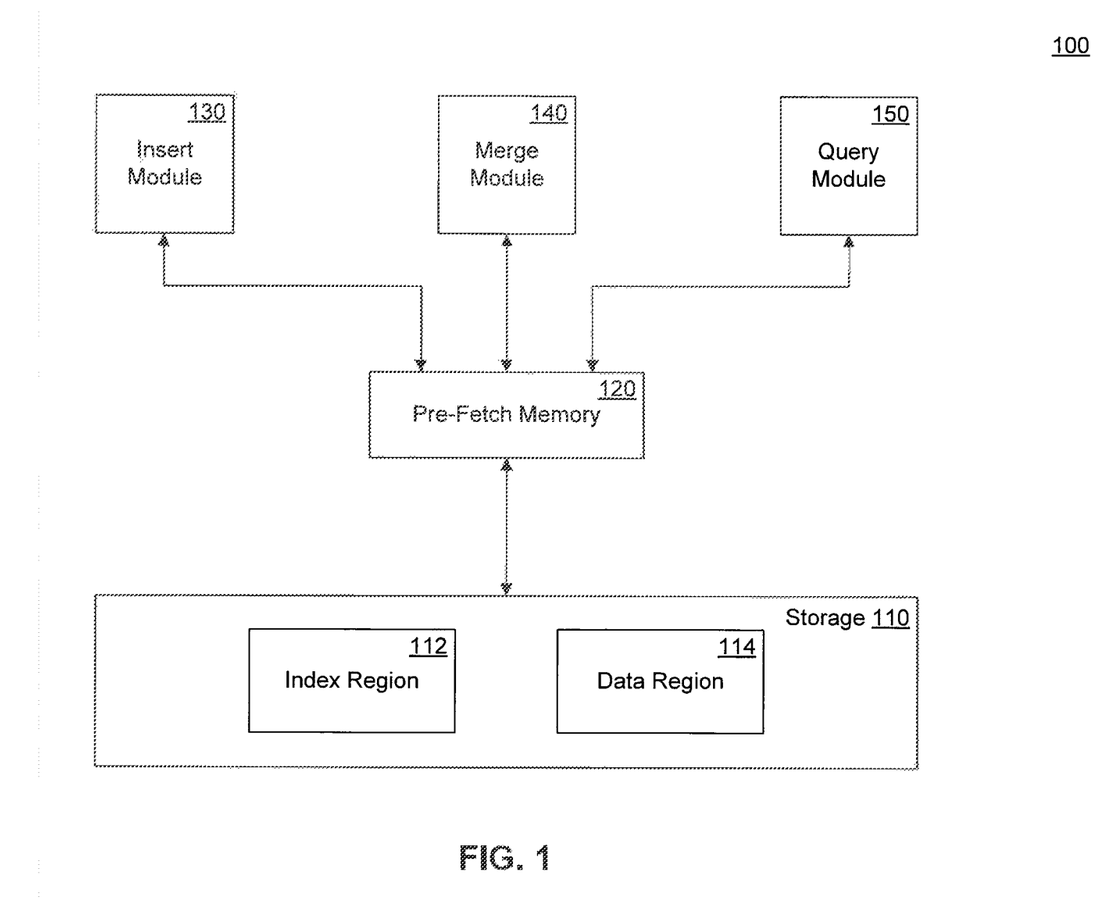
FIG. 1 is a block diagram of a database system that includes a tiered index architecture. according to an example embodiment.

FIG. 1 is a block diagram of a database system 100 that includes a tiered index architecture, according to an example embodiment. Database system 100 includes a storage unit 110, a prefetch memory 120, an insert module 130, a merge module 140 and a query module 150.

Storage unit 110 contains a tiered index region 112 and a data region 114. Tiered index region 112 contains a tiered index including one or more sorted indices, also called tiers. Data region 114 contains data pointed to by elements in the tiered index. In an embodiment, the index region 112 and the data region 114 are not separated, and the tiered index contains the stored data.

Prefetch memory 120 can access data from storage for querying and manipulation during an insert. In an embodiment, the data may be managed in a Least Recently Used (LRU) fashion, and can be moved back to storage (if dirtied) when not accessed for a long time or committed.

Insert module 130 inserts data into the database system and maintains the tiered structure of the index, as further explained below, Merge module 140 performs data merge and sorting operations to maintain the tiered architecture, as further explained below.

Query module 150 retrieves data from the database system, as further explained below.

In order to improve insertion time, insert module 130 can insert data into one of the tiers alone. The tier may not change across multiple or all insert operations. In an embodiment, insert module 130 inserts data into the smallest tier, which is referenced herein as tier0. In an embodiment, insert, module 130 can limit the size of tier0 to fit entirely in prefetch memory 120. Data can flow periodically towards a lower tier, tier1. For example, merge module 140 can move data from tier0 to tier1 after a certain number of data inserts or after a tier0 reaches a threshold size. Alternatively, merge module can move a portion of the data during each insert operation.

Merging two tiers can become costly as the lower tier becomes larger. Therefore, merge module 140 can split the lower tier itself into multiple tiers. For example, as each tier reaches a threshold size, merge module 140 can break down the lowest tier into two tiers. In an embodiment, in order to keep the amount of tiers in check as more data is inserted, merge module 140 can size each tier differently. For example, tier0 can be the smallest, which would retain the advantage of an efficient insert action. Merge module 140 can make each lower tier larger by a certain ratio compared to the previous tier, i.e., the threshold size of each subsequent tier is larger. In an embodiment, when a given tier grows beyond its threshold size, merge module 140 moves data from the tier to a lower tier.

Tier Sizing

Figure 2:
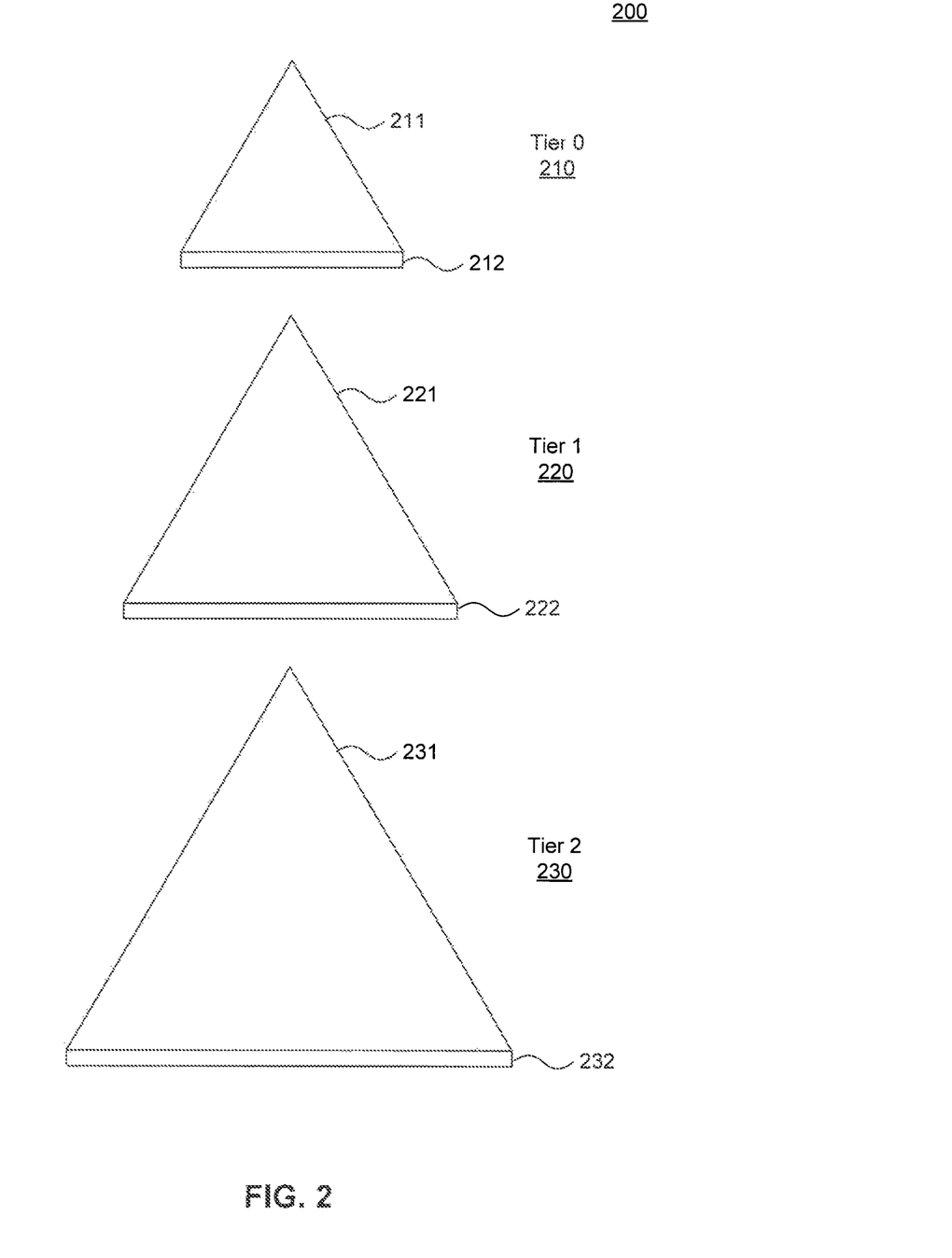
FIG. 2 is a diagram of a tiered index architecture, according to an example embodiment.

FIG. 2 is a diagram of a tiered index architecture 200, according to an example embodiment. In the depicted example, tiered index includes a tier 210 (tier0), a tier 220 (tier1) and a third tier 230 (tier2). Tier 210 includes a sorted set of keys 211 and a row space 212 (or rowset) holding those keys. Likewise, tier 220 includes a sorted set 221 and a rowset 222, and tier 230 includes a sorted set 231 and a rowset 232.

In an embodiment, every tier can comprise a sorted set of keys built as a tree data structure. In an embodiment, the tree data structure is a B-tree, details of which will be understood by those skilled in the relevant arts. In an embodiment, each lower tier is larger than the previous tier by, for example, a fixed ratio.

In an embodiment, merge module 140 adapts the sizes of tiers based on the size of insert loads as they come along over time. For example, the initial size of tier0 can be configured based on a reasonable estimate of the expected sizes of insert loads. In an embodiment, the size of tier0 is based on the very first insert load. As insert loads arrive, merge module 140 can continually calibrate the tier threshold size for each tier. In an embodiment, tier0 is kept small enough so that it can be read entirely in memory.

For example, in a certain usage scenario, the first few loads can be large (e.g., 1 billion rows), but may then be followed by periodic medium sized incremental loads (e.g., 1 million rows) interspersed with trickle loads (e.g., individual values or 100s of rows). Merge module 140 can learn from the usage pattern in order to improve performance, and dynamically tune the sizing of tiers. At the start of each incremental load, if the incremental load size is too small compared to the previous load pattern, merge module 140 can move tier0 data (or merge) with the lower tier. Merge module 140 can determine that a load is too small based on the tier threshold. Merge module 140 may ignore trickle loads when updating dynamic sizing parameters, in order to prevent them from unduly skewing the averages.

The dynamic sizing of tiers can be controlled using various factors, such as, for example, data blocks occupied by the tiers, the rows in each tier, number of distinct keys held by each tier, etc.

In an embodiment, since all inserts are done in tier0, the sub-indices in lower tiers do not need to have any padding in the tree pages to allow for incoming keys. In this example, the lower tiers can be kept fully densely packed, achieving improved compression.

In an embodiment where the database stores non-unique indices, insert module 130 can achieve distinct count maintenance by comparing input keys against the keys in the biggest tier. However, incoming keys may be sparse and probing each key may result in reading almost the entire biggest tier. In an embodiment, merge module 140 limits tier0 size to a certain fraction of the keys present in the biggest tier in the index. In such an example, the other tier size could still be dictated by other factors mentioned above (e.g., data blocks, rows, distinct keys in each tier, etc.). Another way to limit the probing volume would be to probe a limited number of incoming keys instead of all and project the distinct keys statistically. All the keys in the middle tiers may be probed against the biggest tier during the merge action.

In order to maintain the temporal property of data flow, in an embodiment, insert module 130 can insert all data into tier0 and merge module 140 can propagate the data into lower tiers as more data is pushed into the index. In an embodiment, any updates to the data are performed as a delete operation followed by an insertion. In this example, since all inserts go to tier0, the temporal property is maintained.

Inserting and Merging Data

In an embodiment, merge module 140 can merge data from a tier into the next tier by maintaining two sub-indices in each tier. An incremental sub-index can contain data pushed from the previous tier and which is to be merged into the current tier. Under this scheme, whenever a tier grows above a threshold, the entire tier can be pushed to an immediately lower tier as an incremental sub-index of that tier.

Figure 3A:
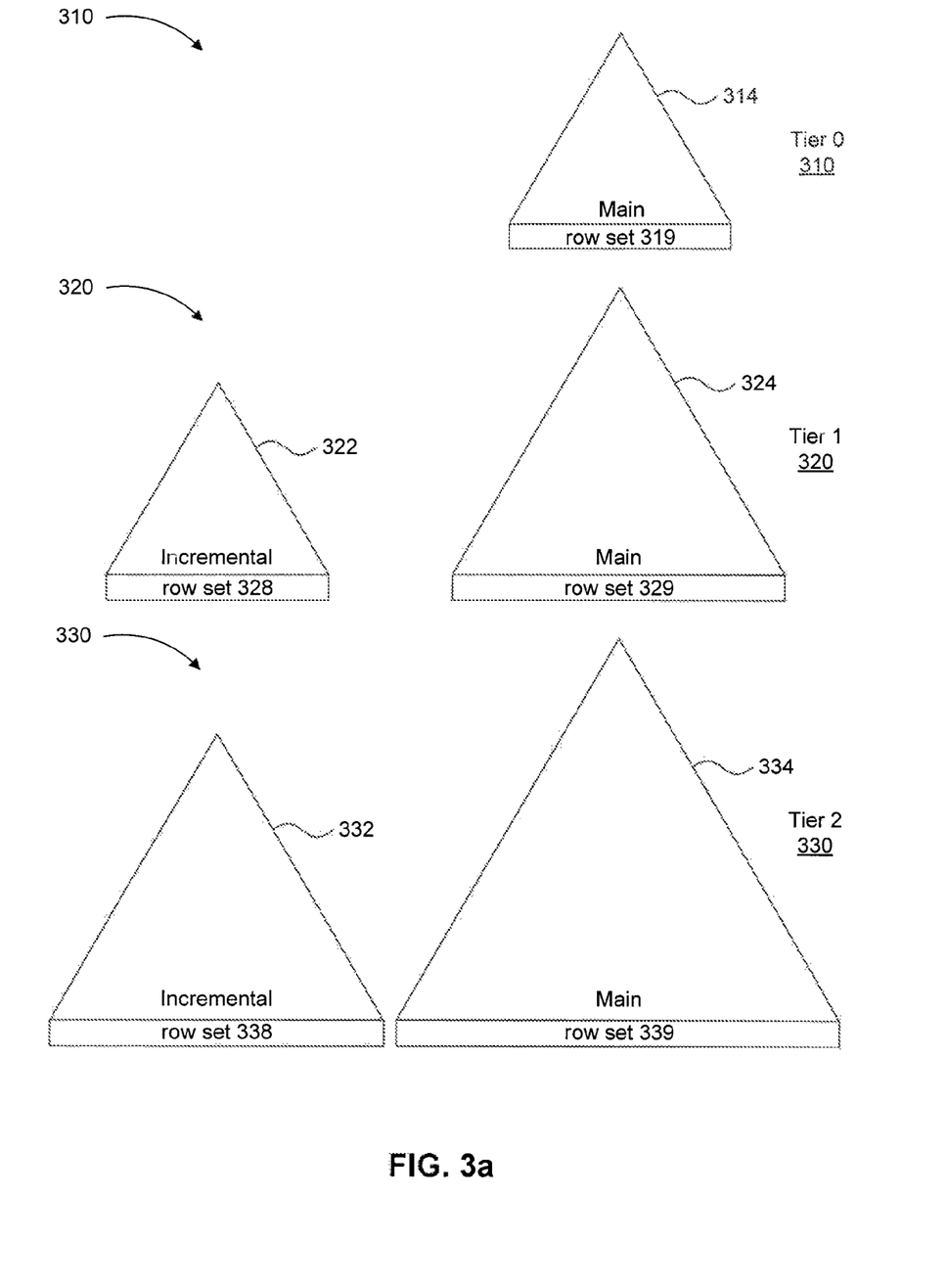
FIG. 3a is a diagram of a sub-index arrangement in a tiered index architecture, according to an example embodiment.

FIG. 3a is a diagram of a sub-index arrangement in a tiered index architecture 300, according to an example embodiment. In the depicted example, tiered index includes a tier 310 (tier0), a tier 320 (tier1) and a tier 330 (tier2). Tier0 contains a main sub-index 314 and a rowset 319. Tier1 contains an incremental sub-index 322, an incremental rowset 328, a main sub-index 324, and a main rowset 329. Tier2 contains an incremental sub-index 332, an incremental rowset 338, a main sub-index 334 and a main rowset 339. In an embodiment, tier0 is defined to not hold an incremental subindex.

Each incremental sub-index and main sub-index includes, for example, a tree of keys and corresponding row space for every entry in it. Tier0 has one sub-index since there is no tier prior to it. Merge module 140 keeps the data in every tier in a consistent state so that all the supported queries can also be performed on all sub-indices including incremental and main sub-indices of each tier.

In order to keep merge cost proportional to insert size over time, merge module 140 can perform merging work on every tier as part of every insert operation into tier0.

Figure 3B:
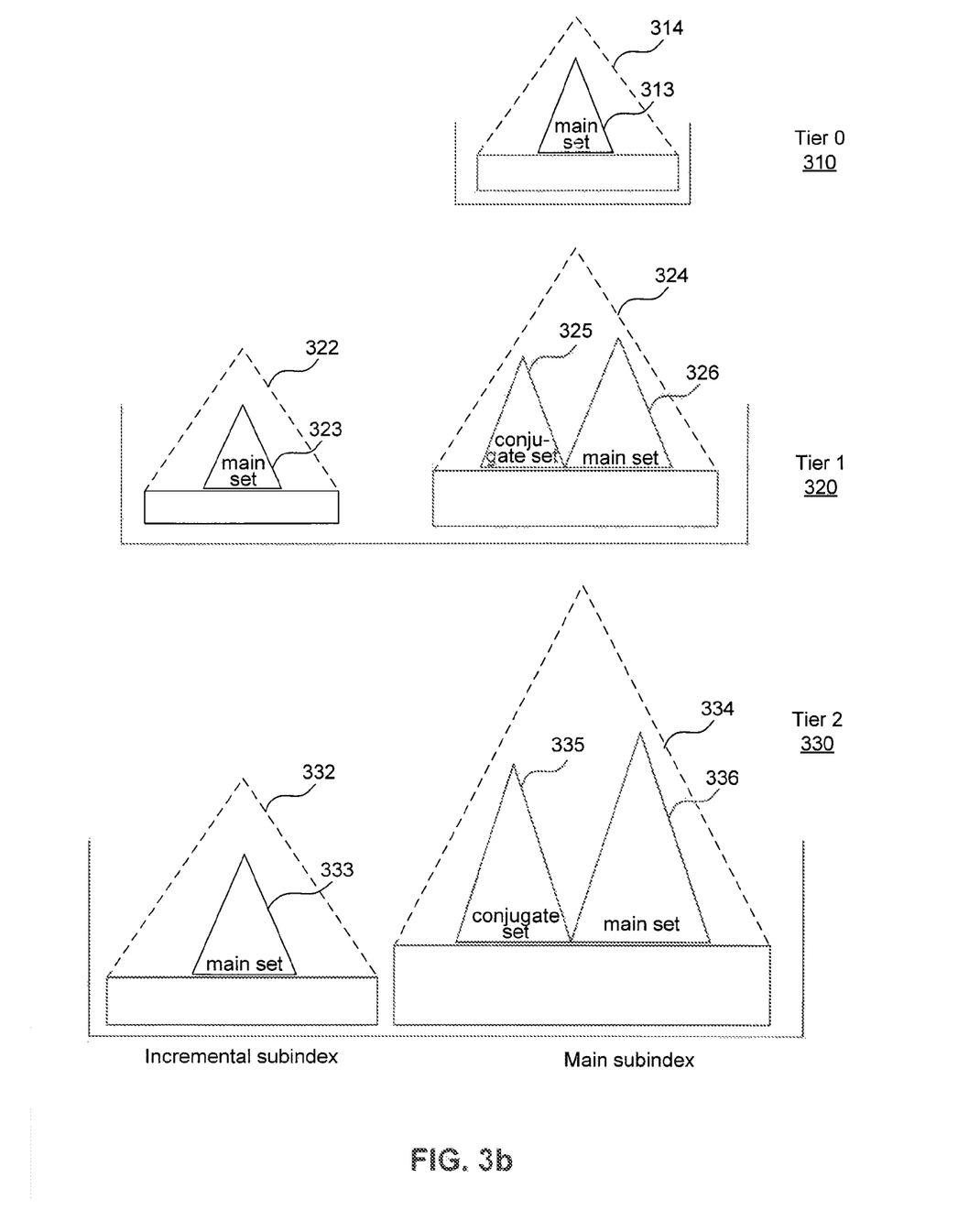
FIG. 3b is a diagram of a sub-index arrangement with sub-index detail in a tiered index architecture, according to an example embodiment.

FIG. 3b is a diagram of a sub-index arrangement with further sub-index details in a tiered index architecture 300, according to an example embodiment.

Sub-index 314 includes a main sorted set of keys 313. Incremental sub-index 322 includes a main sorted set of keys 323. Main sub-index 324 includes a conjugate set of sorted keys 325 and a main sorted set of keys 326. Incremental sub-index 332 includes a main sorted set of keys 333. Main sub-index 334 includes a conjugate set of sorted keys 335 and a main sorted set of keys 336.

In an embodiment, the conjugate set maintains the result of a merge operation between the incremental sub-index and the main sub-index in each tier (except tier0). As part of the merge operation in each tier, keys can be drained from the main set of the incremental sub-index and the main set of the main sub-index and inserted into the conjugate set. This process is further explained in detail below, with reference to FIG. 5.

Figure 4:
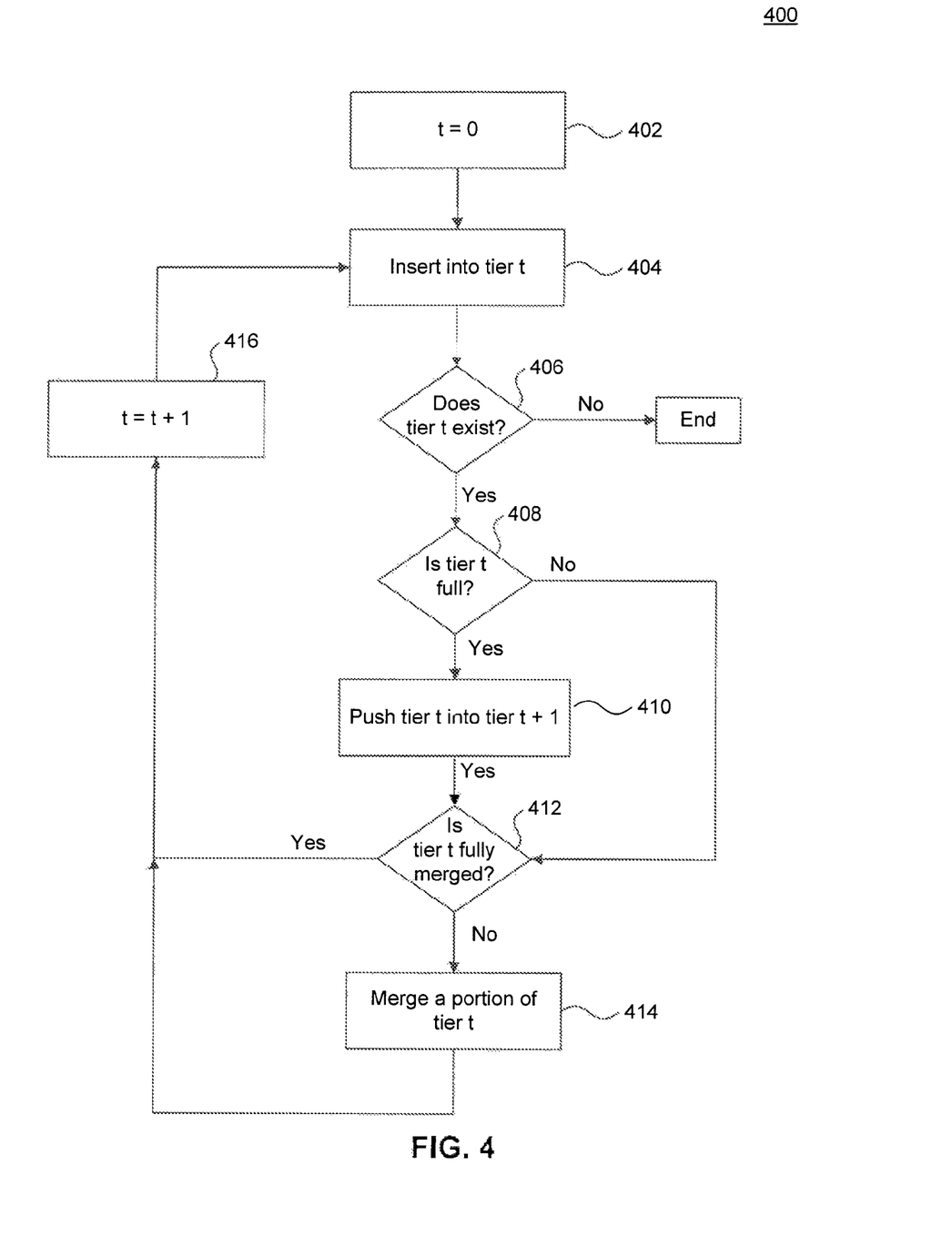
FIG. 4 is a flowchart illustrating a process for inserting data into a tiered index architecture, in accordance with an example embodiment.

FIG. 4 is a flowchart illustrating a process 400 for inserting data into a tiered index architecture, in accordance with an example embodiment. Any step of the process may be performed by one or more of insert module 130, merge module 140 and query module 150.

The process starts by inserting data in tier0 at steps 402 and 404. The process then continues to merge data from the incremental sub-indices into the main sub-indices on the lower tiers. At step 406, the process determines if the next tier exists, and if so moves to step 408. If there is no lower tier, the process ends.

If a lower tier exists, the process verifies whether the tier is full as a result of the insert, if the tier is full, the process pushes the tier into the next tier, as shown at step 410. In this scenario, the process can convert the main sub-index of tier t into the incremental sub-index of tier t±1.

At step 412, the process verifies whether tier t has been fully merged. The process can do this by determine whether there is data in the incremental subindex of tier t, as shown in step 412. If at step 412 the process determines the incremental index is empty, then there is no data to merge and the process continues to the next tier, as shown in step 416. If there is data in the incremental sub-index, i.e., the sub-indices are not fully merged, the process, at step 414, merges a portion of the incremental sub-index into the main sub-index for tier t. An example process in which this merge can be performed is further described below with reference to FIG. 5.

In an embodiment, merge module 140 completely merges an incremental sub-index into the main sub-index before the previous tier reaches its threshold size. Merge module 140 can perform a complete merge of the incremental and main sub-indices in a tier whenever its previous tier's main sub-index grows over its size threshold. In another embodiment, merge module 140 performs sufficient merging after every insert to ensure that when a tier grows over its threshold size, the next tier is fully merged and has no incremental sub-index.

Figure 5:
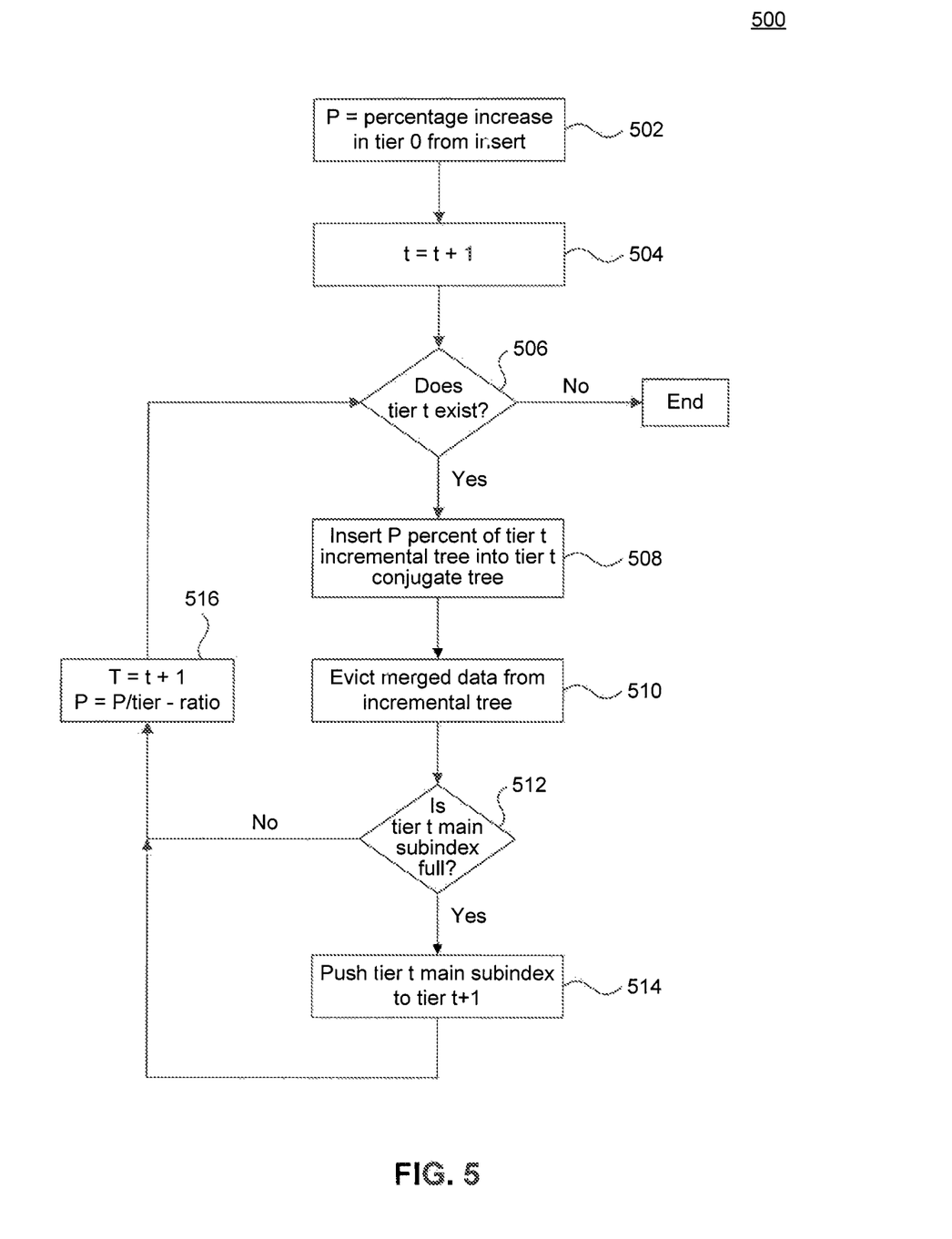
FIG. 5 is a flowchart illustrating a process for merging incremental and main sub-index data in each tier, according to an example embodiment.

FIG. 5 is a flowchart illustrating a process 500 for partially merging incremental and main sub-index data in each tier, according to an example embodiment. Any step of the process may be performed by one or more of insert module 130, merge module 140 and query module 150.

At step 502, the process calculates how much tier0 has been filled by the current insert operation. For example, if 100,000 rows were inserted into tier0, taking it to 50% full from a 35% full state, then the process sets 15% as the percentage P by which the insert filled tier0.

At step 504, the process moves to the next tier, i.e., tier t, and checks whether the tier exists at step 506. If there are no more tiers, the process ends.

If tier t exists, the process merges P percent of tier t's incremental and main sub-index into a conjugate tree (maintained as a separate merge result tree within the main sub-index) of tier t, at step 508. Using a conjugate tree permits storing an intermediate result of a merge, and allows the process to perform a partial merge on each tier for every insert operation. In an embodiment, at any point in time, the keys in a conjugate tree are always smaller (and thus non-intersecting) than the keys present in the incremental sub-index or in the main tree of the main sub-index. Building a merge result tree separately also affords maintaining lower tiers in densely packed fashion. In an embodiment, the conjugate tree and the main tree together are considered to form the main sub-index. Continuing the previous example, if the percentage increase after an insert in tier0 was 15%, the process would merge the incremental sub-index of tier1 into the main sub-index of tier1 so as to increase by 15% the amount of total rows (incremental and main) that have been merged in the tier.

Doing the merge in this manner ensures that the amount of merging work in lower tiers is proportional to the size of the insert load. If the insert load is small, then a small number of rows need to be merged in lower tiers. If the insert load is large, a larger number of rows need to be merged in lower tiers.

At step 510, the process evicts data that already has been merged from the incremental and the main trees of tier t.

At step 512, the process checks whether the main sub-index of tier t is full, that is, whether it exceeds the threshold size for tier t. If the main sub-index is full, the process moves to step 514 and pushes the main sub-index into tier t+1, and making it the incremental sub-index of tier t+1. Otherwise, the process jumps directly to step 516.

At step 516, the process moves to tier t+1 to perform the merge operation in that tier. The process also divides the percentage P of the next tier to be merged by the tier ratio. Since every lower tiers is bigger than the previous tier by the tier ratio, a lower percentage of each tier needs to be merged. Continuing with the previous example, assume that the tier ratio is 30. If the percentage increase after an insert in tier0 was 15%, the process would perform a 15% merge in tier1 (as explained above at step 508), and then a merge 15/30=0.5% in tier2. Again, doing the merge in this manner ensures that the amount of merging work in lower tiers is proportional to the size of the insert load.

As explained above with reference to step 508, the merging process merges data from the incremental sub-index and main tree from main sub-index into a conjugate tree that forms part of the main sub-index. The merging process involves filling the conjugate tree while dividing the main and incremental trees at the end of every merge to evict data that has already been merged.

To perform a query, a cursor may be defined on each sub-index. For example, for a single key find, the cursor first attempts to find the key in the conjugate tree and if it is not found attempts to find the key in the main tree of the sub-index. In the case of an ordered retrieval or a ranged access, the cursor entirely traverses the conjugate tree before switching to probe the main tree. For efficient work allocation, the cursor can also support an interface to provide the ordinal for a key in the combined set of trees. In an embodiment, if a key with provided ordinal in the main tree is requested, then the ordinal is increased by the total number of keys in the conjugate tree. In an embodiment, both key-to-ordinal and ordinal-to-key interfaces are supported.

Deleting Data

The system can improve data deletion by incorporating physical deletes with the merging process described above. In an embodiment, when a delete operation arrives the system can defer the delete in all non-zero tiers and instead maintain a set of records deleted from every tier. The merge action can ignore all such records when constructing the conjugate tree. For example, during a merge process as described in FIG. 5 above, the process can ignore, and thus not merge, those records that were marked as deleted during a delete operation. In an embodiment, the deletes will eventually be processed completely when the merge reads the entire sub-index after a few loads.

In an embodiment, because delete operations do not immediately remove records, queries will refer to the list of deleted records maintained for every tier, for example, when projecting rows.

Distinct Key Count

The number of distinct keys in a tree is a very useful statistic in a database. Key count metadata can be useful, for example, for optimizers when comparing query plans or deciding which query algorithm to use. In an embodiment, for a non-unique sorted index, the system maintains an approximate distinct key count with bound in the tiered index architecture. For a unique sorted index, the distinct key counts are calculated by adding up key counts in individual sub-indices.

In an embodiment, the system maintains an estimate of the distinct key count in the index within a bounded range. For example, the system can maintain a count with each sub-index for how many keys in the particular sub-index are new or different from the keys in the biggest sub-index. Based on these counts, the system can compute a bounded expression for the number of distinct key in the entire index. In an embodiment, this bounded distinct count is integrated into the insert/merge process.

Figure 6:
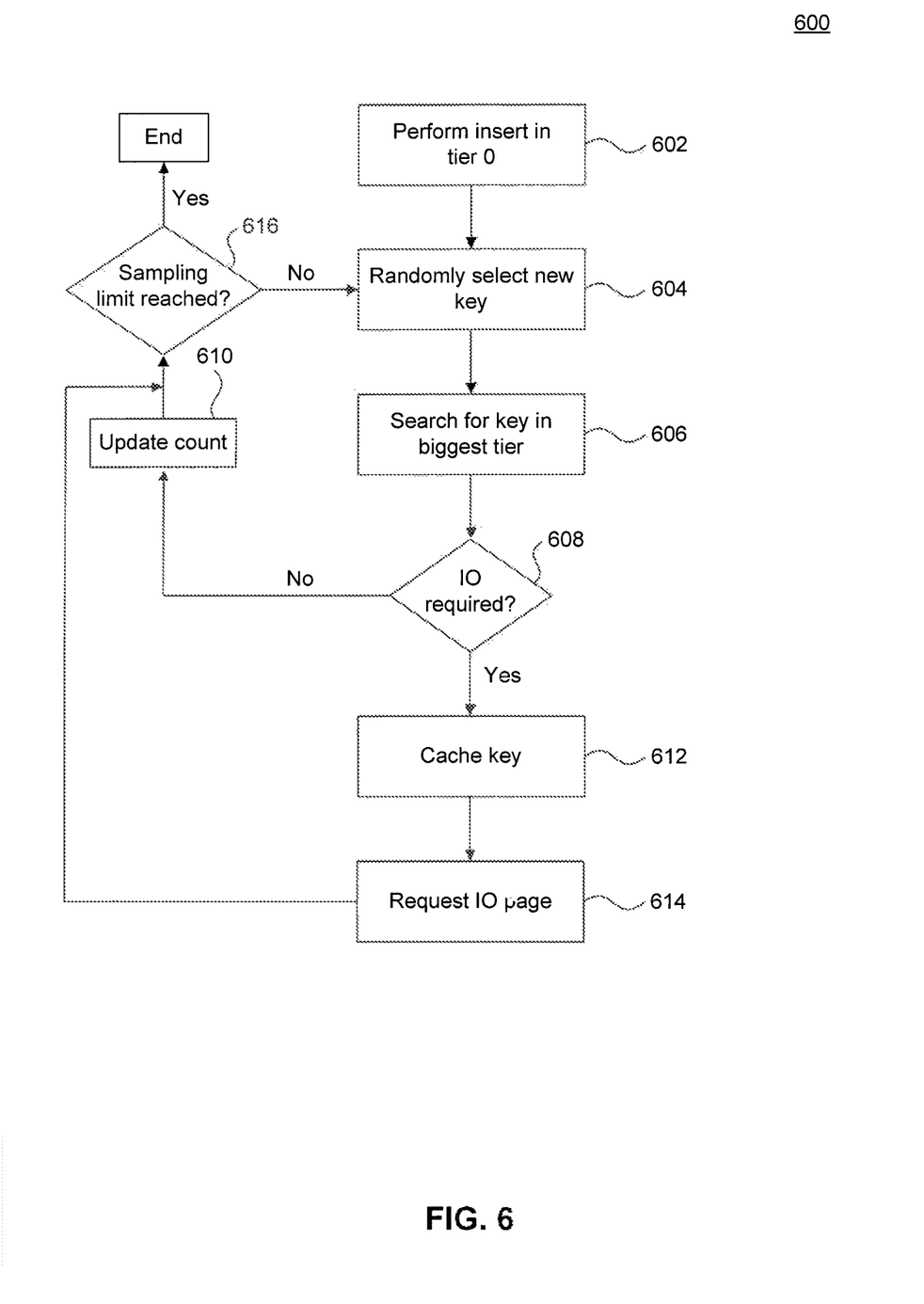
FIG. 6 is a flowchart illustrating a process for computing a bounded distinct count during an insert and merge operation in a tiered index architecture, according to an example embodiment.

FIG. 6 is a flowchart illustrating a process 600 for computing a bounded distinct count metadata during an insert and merge operation in a tiered index architecture, according to an example embodiment. Any step of the process may be performed by one or more of insert module 130, merge module 140 and query module 150.

At step 602, insert module 130 receives an incremental insert load. An incremental load may contain new keys, and these keys may be sparsely located in the biggest tree.

At step 604, the process randomly probes one or more of the keys inserted in tier0, in accordance with an example embodiment. Probing every inserted key might require accessing different pages in the biggest tree, which may incur a very high I/O cost of reading pages from storage and loading them into memory. In an embodiment, the process randomly probes one or more of the inserted keys added to tier0 and begins to search for them in the biggest tier, as shown in step 606.

The process continues to search for the key until an I/O operation is required to continue searching the biggest tier. If, at step 608, the search ends without requiring an I/O operation, the process moves directly to step 610 to update the key count. If the search requires an I/O operation, the process proceeds to cache the key at step 612 and request the I/O page at step 614. Instead of waiting for the I/O operation to retrieve the data, the process can continues with the key insertion. At step 616, the process determines if it has reached the limit of keys to be sampled. If the process has reached the limit, it ends. If the process has not finished, the process moves back to step 604 to probe a new key. If the cache holds the pending key for which an 110 request was initiated, the process can find this I/O page in memory and update the key count. The cache can also be cleared and the process can continue with the current key being inserted.

In an embodiment, process 600 can occur for every insert operation. Once the process samples a given number of keys (as described in step 616) the process ends. The next time the system receives an insert operation, the process reinitiates and probes a new set of keys.

Process 600 permits probing a few random keys to obtain a bounded estimate of the distinct key count, while keeping I/O delays in check. When coupled with tier0 size restriction, as described above, the impact of randomness can remain restricted within the key ratio among tier0 and the biggest tier.

Additionally, in an embodiment, the system can perform a probing when the tier0 sub-index gets pushed into tier1 with each incremental insert load. For example, when performing a merge between the incremental tree and the main sub-index of tied as a result of an insert operation (as described with reference to FIG. 5 above), the system can probe the merged keys in the biggest tier. In an embodiment, the system performs a bottom-up tree traversal for searching the keys relative from the position last searched. Since there can be a greater likelihood that these keys will appear in same vicinity, this bottom-up traversal may require less number of key comparisons than traditional top-down search. In an embodiment, during this proportional merge, the merged keys are probed in the biggest tier. in an embodiment, the operation is required only for tier1 alone, since for all other tiers (of bigger size) all the keys are already accounted considering they were pushed from tied in the past. In an embodiment, the same process of probing occurs when physically deleting a key from a sub-index, except when there is no further information gain in re-probing these deleted keys. For example, in the case when a sub-index had all keys probed and marked as duplicates or the sub-index had all the keys probed and marked as distinct, the process of probing may be omitted when deleting keys.

As a result of the probing process thus described, each sub-index, except the biggest one, can have a count of the number of keys probed and the number of keys found new. In an embodiment, the system uses this information to compute a bounded distinct count. An example of this computation is described below. In an embodiment, for every tier lower than tier1, the number of keys probed is ensured to be equal to the number of keys in the sub-index.

Let, $C_n$ be the number of keys in the lowest (i.e., biggest) sub-index;

$P_i$ be the number of keys probed; and $N_i$ be the number of keys found "new,"

for every other sub-index i.

If a sub-index has less number of keys probed than others, the number can be scaled up, or normalized, using the "keys" to "keys probed" ratio. The system can use this metadata to compute an upper bound of the number distinct keys by adding the count of key s in the biggest tree and the number of "new" keys in all other sub-indices:

$$\text{Upper Bound} = C_n + \Sigma N_i$$

Since a key that is "new" in one sub-index can be the same "new" key in another sub-index, the lower bound can be computed as:

$$\text{Lower Bound} = C_n + \text{Max}(N_0, N_0, N_2, \ldots, N_n)$$

In an embodiment, the system can compute an approximate distinct count by scaling the "new" keys for a sub-index using the "new keys" to "actual keys" ratio for other sub-indices. This scaling, can help correct new key counts for keys that are not present in the biggest tree but are present in other sub-indices.

Example Computer System

Figure 7:
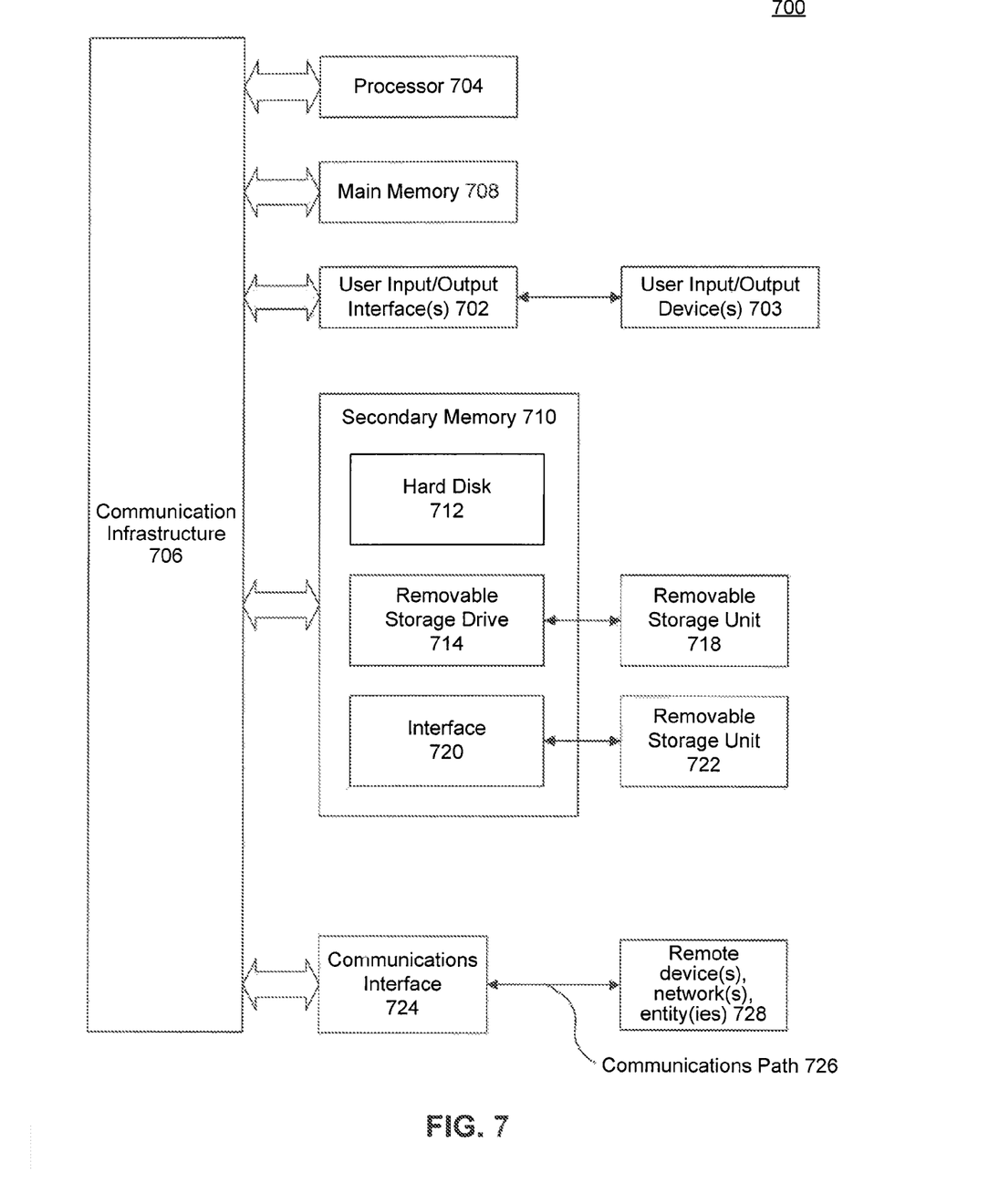

Various embodiments can be in for example, using one or more well-known computer systems, such as computer system 700 shown in FIG. 7 Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 7. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for storing data in a database, comprising:

receiving, by at least one processor, an insert operation including data to be inserted into a first tier, wherein the first tier has a first threshold size, and wherein the first tier has a full state indicating how much of the first threshold size has been allocated by existing data in the first tier;

inserting the received data into the first tier;

determining a variance between the full state of the first tier prior to the inserting and the full state after the inserting;

determining that a second tier comprises an incremental index of data previously stored on the first tier and a main index of data;

merging, based on the variance, a proportional portion of data from the incremental index into the main index on the second tier, wherein the merged data is maintained as a separate merge result on the second tier; and pushing, by the at least one processor, the entire first tier into the second tier when the first tier exceeds a first threshold size.

2. The method of claim 1, wherein the inserting comprises:

creating, by the at least one processor, the second tier; and assigning, by the at least one processor, a second threshold size to the second tier.

3. The method of claim 2, wherein the second threshold size is larger than the first threshold size.

4. The method of claim 2, wherein the first and second threshold sizes are dynamically adjusted based on a received data load.

5. The method of claim 1, the pushing the entire first tier further comprising:

converting, by the at least one processor, the first tier into the incremental index of the second tier, wherein the second tier comprises the incremental index and a main index.

6. The method of claim 1, wherein the receiving comprises:

determining, by the at least one processor, that a key associated with data in the data load is a new key; and calculating, by the at least one processor, a number of occurrences of the key in a largest tier.

7. A system comprising:

a memory;

at least one processor coupled to the memory and configured to:

receive an insert operation including data to be inserted into a first tier, wherein the first tier has a first threshold size, and wherein the first tier has a full state indicating how much of the first threshold size has been allocated by existing data in the first tier;

insert the received data into the first tier;

determine a variance between the full state of the first tier prior to the inserting and the full state after the inserting;

determine that a second tier comprises an incremental index of data previously stored on the first tier and a main index of data;

merge, based on the variance, a proportional portion of data from the incremental index into the main index on the second tier, wherein the merged data is maintained as a separate merge result on the second tier; and push, by the at least one processor, the entire first tier into the second tier when the first tier exceeds a first threshold size.

8. The system of claim 7, the at least one processor further configured to:

create the second tier; and assign a second threshold size to the second tier.

9. The system of claim 8, wherein the second threshold size is larger than the first threshold size.

10. The system of claim 8, wherein the first and second threshold sizes are dynamically adjusted based on a received data load.

11. The system of claim 7, the at least one processor further configured to:

convert the first tier into the incremental index of the second tier, wherein the second tier comprises the incremental index and a main index.

12. The system of claim 7, the at least one processor further configured to:

determine that a key associated with data in the data load is a new key; and calculate a number of occurrences of the key in a largest tier.

13. A non-transitory computer-readable device having instructions stored thereon that, when executed by at least one computing device, cause the at least one computing device to perform operations comprising:

receiving, by at least one processor, an insert operation including data to be inserted into a first tier, wherein the first tier has a first threshold size, and wherein the first tier has a full state indicating how much of the first threshold size has been allocated by existing data in the first tier;

inserting the received data into the first tier;

determining a variance between the full state of the first tier prior to the inserting and the full state after the inserting;

determining that a second tier comprises an incremental index of data previously stored on the first tier and a main index of data;

merging, based on the variance, a proportional portion of data from the incremental index into the main index on the second tier, wherein the merged data is maintained as a separate merge result on the second tier; and pushing, by the at least one processor, the entire first tier into the second tier when the first tier exceeds a first threshold size.

14. The non-transitory computer-readable device of claim 13, the operations further comprising:

creating the second tier; and assigning a second threshold size to the second tier.

15. The method of claim 1, wherein the merged data stored as the separate result is removed from the incremental index and the main index on the second tier.

16. The method of claim 1, wherein the merging comprises:

determining that the incremental index is not full prior to the merging.

\* \* \* \* \*